US008668497B2

(12) United States Patent
Nebe et al.

(10) Patent No.: US 8,668,497 B2
(45) Date of Patent: Mar. 11, 2014

(54) FREE FALL SIMULATOR

(75) Inventors: Boris Nebe, Bottrop (DE); Manuel Dohr, Munich (DE)

(73) Assignee: Indoor Skydiving Bottrop GmbH, Bottrop (DE)

( * ) Notice: Subject to any disclaimer, the term of this patent is extended or adjusted under 35 U.S.C. 154(b) by 113 days.

(21) Appl. No.: 13/063,263

(22) PCT Filed: Sep. 1, 2009

(86) PCT No.: PCT/EP2009/061251
§ 371 (c)(1),
(2), (4) Date: Mar. 10, 2011

(87) PCT Pub. No.: WO2010/028980
PCT Pub. Date: Mar. 18, 2010

(65) Prior Publication Data
US 2011/0165545 A1     Jul. 7, 2011

(30) Foreign Application Priority Data

Sep. 11, 2008   (DE) .......................... 10 2008 046 759

(51) Int. Cl.
    *G09B 9/08*        (2006.01)
(52) U.S. Cl.
    USPC ........................................... 434/59; 434/247
(58) Field of Classification Search
    USPC .......... 434/11–71, 247, 252, 258; 472/49–50, 472/67–68, 136–137; 73/147
    See application file for complete search history.

(56) References Cited

U.S. PATENT DOCUMENTS

| 2,914,941 A | 12/1959 | Frenzl |
| 5,593,352 A * | 1/1997 | Methfessel et al. ............. 472/50 |
| 6,083,110 A * | 7/2000 | Kitchen et al. .................. 472/49 |
| 7,524,189 B2 | 4/2009 | Delalande |
| 2004/0115593 A1 | 6/2004 | Hatlestad et al. |

FOREIGN PATENT DOCUMENTS

| CN | 101031470 A | 9/2007 |
| EP | 1 539 572 A1 | 6/2005 |
| EP | 1 964 776 A1 | 9/2008 |
| GB | 536 189 A | 5/1941 |

(Continued)

OTHER PUBLICATIONS

Int'l Search Report and Written Opinion issued on Dec. 30, 2009 in Int'l Application No. PCT/EP2009/061251.

(Continued)

*Primary Examiner* — Timothy A Musselman
(74) *Attorney, Agent, or Firm* — Panitch Schwarze Belisario & Nadel LLP (57) ABSTRACT

A free fall simulator includes a self-contained air circuit and a hover chamber in which persons can hover as a result of an air stream directed vertically upward. A lower opening is located at a lower end of the hover chamber and an upper opening is located at an upper end of the hover chamber. A substantially closed air guide channel includes at least one fan. The channel connects the lower opening and the upper opening of the hover chamber. At least one air inlet opening and at least one air outlet opening allow for exchanging air within the air guide channel. The simulator includes redirecting lamellae which redirect an air stream within the air guide channel in corner areas or areas of high curvature, wherein at least one air outlet opening is disposed within the redirecting lamellae.

21 Claims, 8 Drawing Sheets

(56) References Cited

FOREIGN PATENT DOCUMENTS

| JP | 63-204129 A | 8/1988 |
|----|-------------|--------|
| WO | 0059595 A1 | 10/2000 |
| WO | 2006/012647 A2 | 2/2006 |

OTHER PUBLICATIONS

Barlow et al, "Low-Speed Wind Tunnel Testing," Third Ed., John Wiley & Sons, Inc., pp. 36-37 (Feb. 1999).
Rae, Jr. et al, "Low-Speed Wind Tunnel Testing," Second Ed., John Wiley & Sons, pp. 12-15, 46-49 (1984).
De France, Report No. 459, "The N.A.C.A. Full-Scale Wind Tunnel," pp. 3-10 (Mar. 13, 1933).
Bradshaw et al, "Wind Tunnel Design—Corner Vanes," retrieved from http://http://navier.stanford.edu/bradshaw/tunnel/cornervane.html, date unknown (admitted prior art).
Pankhurst et al, "Wind-Tunnel Technique—An Account of Experimental Methods in Low- and High-Speed Wind Tunnels," Sir Isaac Pitman & Sons, Ltd., pp. 34-35, 92-93 (1952).
British Intelligence Objectives Sub-Committee, "Report on Visit to Luftfahrtforschungsanstalt Herman Göring, Volkenrode, Brunswick," B.I.O.S. Final Report No. 160, date unknown (admitted prior art).
Office Action issued May 4, 2012 in EP Application No. 09 782 436.1.
Third Party Submission filed Jul. 22, 2011 in EP Application No. 09782436.1.
Office Action issued Jan. 14, 2013 in CN Application No. 200980135745.6.

* cited by examiner

FREE FALL SIMULATOR

CROSS-REFERENCE TO RELATED APPLICATIONS

This application is a Section 371 of International Application No. PCT/EP2009/061251, filed Sep. 1, 2009, which was published in the German language on Mar. 18, 2010, under International Publication No. WO 2010/028980 A1 and the disclosure of which is incorporated herein by reference.

BACKGROUND OF THE INVENTION

The present invention relates to a free fall simulator including a self-contained air circuit and an aeration device for a wind tunnel, in particular a free fall simulator.

A free fall simulator including a self-contained air circuit is an apparatus adapted to maintain a person in a hovering position in a (as a rule controllable) vertically ascending air stream which flows through a hover chamber. After exiting an upper opening of the hover chamber, the air stream is redirected to a lower opening of the hover chamber via an air guide channel in such a manner that a self-contained air circuit is formed.

A typical effect of these so-called closed-type free fall simulators is that, due to pressure losses, the air within the simulator is heated which entails various problems. On the one hand, the overheating of the air may be perceived as unpleasant by the persons using the simulator, or in case of a considerable overheating, may even be injurious to health. On the other hand, the heating of the air results in a reduction of the air density which in turn decreases the force keeping the hovering person in equilibrium. In total, an increased control expenditure is necessary due to the combination of fans frequently arranged next to each other and the aerating means which can be opened as required.

Several approaches have been already proposed for reducing the disadvantages just described.

EP 19 64 776 A1 shows a free fall simulator in which persons can be lifted in a vertical area by means of a generated air stream. The curved recirculation lines are in this case constructed from materials which exhibit a high heat conductivity. In addition, a cooling-water circuit moderates the temperature within the free fall simulator. Such a temperature regulation is associated with a limited material choice and complicated.

Another way for reducing the above-indicated general problems of closed-type free fall simulators is shown in EP 1 539 572 B1. Here, a free fall simulator for various learning, educating and training purposes for parachutists or certified competitors is described. In order to reduce the overheating of the air due to the operation of propeller fans, a fresh air intake is provided in an upper part of a dome. A plurality of extractor fans ensure the aspiration of air and further allow the temperature of the flight simulator to be controlled. Here, it is hence a so-called active air exchange, which means that additional machines, namely the extractor fans, are used to guarantee the air exchange. This leads to increased energy consumption which, together with the manufacturing costs for the extractor fans, requires considerable additional financial expenditures.

A so-called passive air exchange is described in WO 2006/012647 A2. This prior art free fall simulator is of an essentially rectangular configuration, with a hover chamber being provided in a first vertical section followed by a downstream first horizontal section in which two fans are arranged for generating an air stream. The first horizontal section is followed by a second vertical section serving the purpose of redirecting the air stream toward a bottom area. In this second vertical section, an inlet door and an outlet door are installed so as to narrow the flow cross-section and form a jet. A pressure gradient is thereby formed between the inner space and the outer space of the tunnel so that air exchange takes place and the temperature is thereby moderated. A disadvantage of this free fall simulator is that due to the constriction of the flow cross-section by the inlet door and outlet door, the flow speed is further increased in the area of these doors resulting in increased air friction with additional heat generation. Moreover, the inlet and outlet doors are exposed to extremely high stress due to their orientation into the air stream.

BRIEF SUMMARY OF THE INVENTION

The present invention is based on the task of proposing a free fall simulator and an aeration device for a wind tunnel, in particular a free fall simulator, wherein the temperature in the interior is to be reduced effectively and at low cost expenditure. This task is solved by a free fall simulator according to the claims of the present application and an aeration device according to the claims of the present application.

According to a first aspect of the present invention, the above task is in particular solved by means of a free fall simulator having a self-contained air circuit, including a hover chamber in which persons can hover as a result of an air stream directed vertically upward, including a lower opening at a lower end and an upper opening at an upper end, a substantially closed air guide channel including at least one fan. The channel connects the lower opening and the upper opening of the hover chamber. At least one air inlet opening and at least one air outlet opening allow for exchanging air within the air guide channel. The simulator further includes a redirecting means, in particular redirecting lamellae which redirect an air stream within the air guide channel in corner areas or areas of high curvature, wherein at least one air outlet opening is disposed within the redirecting means.

An important point of the present invention is that an air outlet opening is disposed precisely where the air redirecting means are arranged which are necessary for the operation of closed-type free fall simulators. The centrifugal forces acting upon the air stream are thereby utilized in the respective areas in an elegant manner so that no special air deflection means need to be constructed to direct a part of the air stream out of the interior of the channel. An effective and energy-efficient cooling of the internal air of the free fall simulator is thus achieved.

Preferably, the air stream exiting the air outlet opening can be variably adjusted by changing a cross-sectional area of the air outlet opening. This allows reactions to external influences such as temperature or air pressure.

In a preferred embodiment of the present invention, a pivotable and/or displaceable closing device is associated with the air outlet opening for varying the exiting air stream. A particularly simple varying of the exiting air stream is thus possible.

If redirecting lamellae are provided for redirecting the air stream, one redirecting lamella for varying the exiting air stream is preferably pivotable and/or displaceable. The redirecting lamellae hence fulfill a double function, namely the redirecting, on the one hand, and the deflecting, on the other, of parts of the air stream, which makes an additional component superfluous, whereby costs can be saved.

Preferably and in the case where redirecting lamellae are provided for redirecting the air stream, at least one redirecting lamella, preferably the entirety of the redirecting lamellae, is displaceable in the radial direction. A radial displacement is constructively simple and enables the displaced lamellae to be accommodated in a space-saving manner.

Preferably, the at least one lamella is formed to correspond to an opening of the air guide channel in such a manner that the opening can be opened or closed as a result of the radial displacement of the at least one redirecting lamella. Such a displacement of one redirecting lamella creates a further opportunity to vary the air stream.

In a particularly preferred further development, a plurality of redirecting lamellae can be discretely displaced as a whole in the radial direction, preferably by one length corresponding to the radial distance of two adjacent redirecting lamellae, in such a manner that the opening is closed by one redirecting lamella both before and after a displacing operation. This makes it possible that even without additional components or measures, shifting one or more redirecting lamellae outward will not lead to a pressure loss.

Preferably, the air pressure can be controlled within an area in which redirecting lamellae shiftable out of the air guide channel can be introduced in such a manner that a pressure loss is further minimized, for example, via the remaining openings such as crevices, cracks or the like. Thanks to this embodiment of the present invention, the pressure loss due to a displacement of the redirecting lamellae is minimized in a constructively simple and effective manner.

Preferably, the air outlet opening comprises a funnel-shaped air outlet diffuser. This facilitates the discharging of the exiting portion of the air stream.

In another preferred embodiment of the present invention, at least one closing device of the air inlet opening for varying the incoming air stream is formed to be pivotable and/or displaceable, in particular outwardly pivotable. The amount of incoming air may thus likewise be controlled in a simple manner, which indirectly also achieves the amount of exiting air, hence the heat dissipation toward the outside due to an overall air stream volume which is constant in the stationary state.

The air inlet opening and/or the air outlet opening is/are preferably arranged in an upper air guide channel section. When the air inlet opening is arranged in an upper air guide channel section, the heated air, after exiting the air guide channel, is guided away from same, since heated air will always rise.

Preferably, the air inlet opening is spatially separated from the air outlet opening so that the exiting air cannot be aspirated again by the air inlet opening, which can in particular be achieved by an air barrier.

The closing devices of the air inlet and/or air outlet openings preferably can be controlled or regulated electronically, wherein the closing devices can in particular be synchronized to each other. Using an electronic control or regulation, the exiting or incoming air stream can be controlled or regulated in a particularly precise manner. When the closing devices are in this case synchronized, an extremely efficient air exchange is obtained.

Particularly in the case where the closing device in the inlet and/or outlet means can be controlled or regulated electronically, measuring devices are preferably provided for measuring various parameters such as in particular the temperature, flow rate or air humidity of the volume flow or the like, with the measured values obtained by the measuring device preferably contributing to the electronic control or regulation of the closing device. This enables a particularly fine adjustment of the closing devices which is performed in particular independently of the subjective impressions of the operating staff, and thus is particularly well adapted to the respective requirements. The measurement of increased temperature, for instance, can result in an automatic enlargement of the cross-section of the outlet opening and/or inlet opening.

In a preferred further development, four fans are provided, arranged in a quadratic configuration within an air guide channel of a preferably quadratic cross-section. The quadratic configuration thereby refers to such an arrangement of the four fans where the center of gravity thereof lies in one plane which is perpendicular to the mean flow direction of the air stream. The advantage of this arrangement is that a particularly homogenous distribution of the air stream is achieved.

The fan(s) is/are preferably formed in a vertical section of the air guide channel. The limited availability of floor space such as is the case in theme parks, for example, is thereby taken into account. Since the fans including the necessary feeding and discharge lines have a relatively long extension in the flow direction, it therefore makes sense to insert same in vertical arrangement so that the height of the free fall simulator, which is in any case necessary due to the hover chamber, is utilized and, at the same time, the need for floor space is reduced to a minimum. Incidentally, a free space remains in this case for installing air outlet and/or air inlet openings in an upper, preferably horizontally extending section of the air guide channel.

In a preferred embodiment of the present invention, the floor area of the hover chamber is formed as a polygon, preferably a decagon to tetradecagon, in particular a dodecagon. This shape allows a compromise between the most "circular" formation possible to the hover chamber and a relatively uncomplicated and inexpensive glass/steel construction for the hover chamber. Moreover, a safety net can be comparatively well anchored.

Preferably, the hover chamber and/or the cross-section of a funnel-shaped diffuser which follows the hover chamber expand(s) upwardly. When the hover chamber is configured so as to expand upwardly, then the pressure acting upon a person hovering in the hover chamber decreases upwardly so that an inherent safety mechanism is created preventing a hovering person from gaining height beyond a specific limit. The provision of a funnel-shaped, upwardly expanding diffuser allows a reduction of the flow speed which is also associated with a reduction of the developing frictional heat.

As an alternative to an upwardly expanding hover chamber, same can also have an upwardly constant cross-section. Constant, height-independent conditions are thereby created, which best simulates the circumstances of a real free fall.

Preferably, the cross-section of the hover chamber and/or the cross-section of the funnel-shaped diffuser which follows the hover chamber pass from the bottom to the top from a polygon of a higher order to a polygon of a lower order, in particular from a dodecagon to a tetragon. Thereby, one succeeds in maintaining a flow as laminar as possible in a simple manner despite various demands on the geometry of the hover chamber and the cross-sectional geometry of the air guide channel.

In a preferred embodiment of the present invention, at least one safety net is provided for protecting persons within the hover chamber or limiting the hover chamber, on the net suspensions of which damping elements are provided for shock absorption. The shock absorption prevents people from getting injured when falling down onto the safety net.

According to a second aspect of the present invention, the task mentioned above is also solved by means of a free fall simulator having a self-contained air circuit, including a hover chamber in which persons can hover as a result of an air stream directed vertically upward, including a lower opening at a lower end and an upper opening at an upper end. A substantially closed air guide channel includes at least one fan. The channel connects the lower opening and the upper opening of the hover chamber. The simulator further includes redirecting means, in particular redirecting lamellae which redirect an air stream within the air guide channel in corner areas or areas of high curvature, wherein at least one redirecting lamella can be cooled by means of a cooling device.

The free fall simulator according to the second aspect of the present invention allows an effective reduction of the temperature within the free fall simulator which is coupled with a relatively low cost expenditure. In particular, a very low-noise construction is made possible. Airlocks are not necessary. The free fall simulator according to the second aspect of the present invention is in particular advantageous in warm regions since it is possible to cool the internal air below the external temperature.

Preferably, at least one redirecting lamella has a hollow space into which a cooling medium supplied by the cooling device can be introduced. The at least one redirecting lamella can thus be cooled in a constructively simple and effective manner.

In a preferred embodiment of the present invention, at least one redirecting lamella is made of aluminum, in particular an extruded aluminum profile. The at least one redirecting lamella can then be easily manufactured and is suited to effectively absorb and dissipate heat generated inside the free fall simulator. Alternatively, welded sheet steels or the like may be used.

The free fall simulator according to the first aspect of the present invention can also be combined with the free fall simulator according to the second aspect of the present invention.

Furthermore, the task mentioned above is preferably solved by means of an aeration device for a wind tunnel, in particular for a free fall simulator, including an air inlet opening and at least one air outlet opening for exchanging air within the wind tunnel, and redirecting means, in particular redirecting lamellae, which redirect an air stream within the air tunnel in corner areas or areas of high curvature, wherein at least one air outlet opening is disposed within the redirecting means.

The dependent claims yield further embodiments.

BRIEF DESCRIPTION OF THE SEVERAL VIEWS OF THE DRAWINGS

The foregoing summary, as well as the following detailed description of the preferred embodiments of the present invention, will be better understood when read in conjunction with the appended drawings. For the purpose of illustrating the invention, there are shown in the drawings embodiments which are presently preferred. It should be understood, however, that the invention is not limited to the precise arrangements and instrumentalities shown.

In the following, the invention will also be described with respect to further features and advantages on the basis of exemplary embodiments which will be explained in greater detail with reference to the figures. In the drawings.

DETAILED DESCRIPTION OF THE INVENTION

Certain terminology is used in the following description for convenience only and is not limiting. The words "lower," "bottom," "upper" and "top" designate directions in the drawings to which reference is made. The words "inwardly" and "outwardly" refer to directions toward and away from, respectively, the geometric center of the device, and designated parts thereof, in accordance with the present invention. Unless specifically set forth herein, the terms "a," "an" and "the" are not limited to one element, but instead should be read as meaning "at least one." The terminology includes the words noted above, derivatives thereof and words of similar import.

In the following description, the same reference numerals will be used for equal components or components of equal effect.

Figure 1:
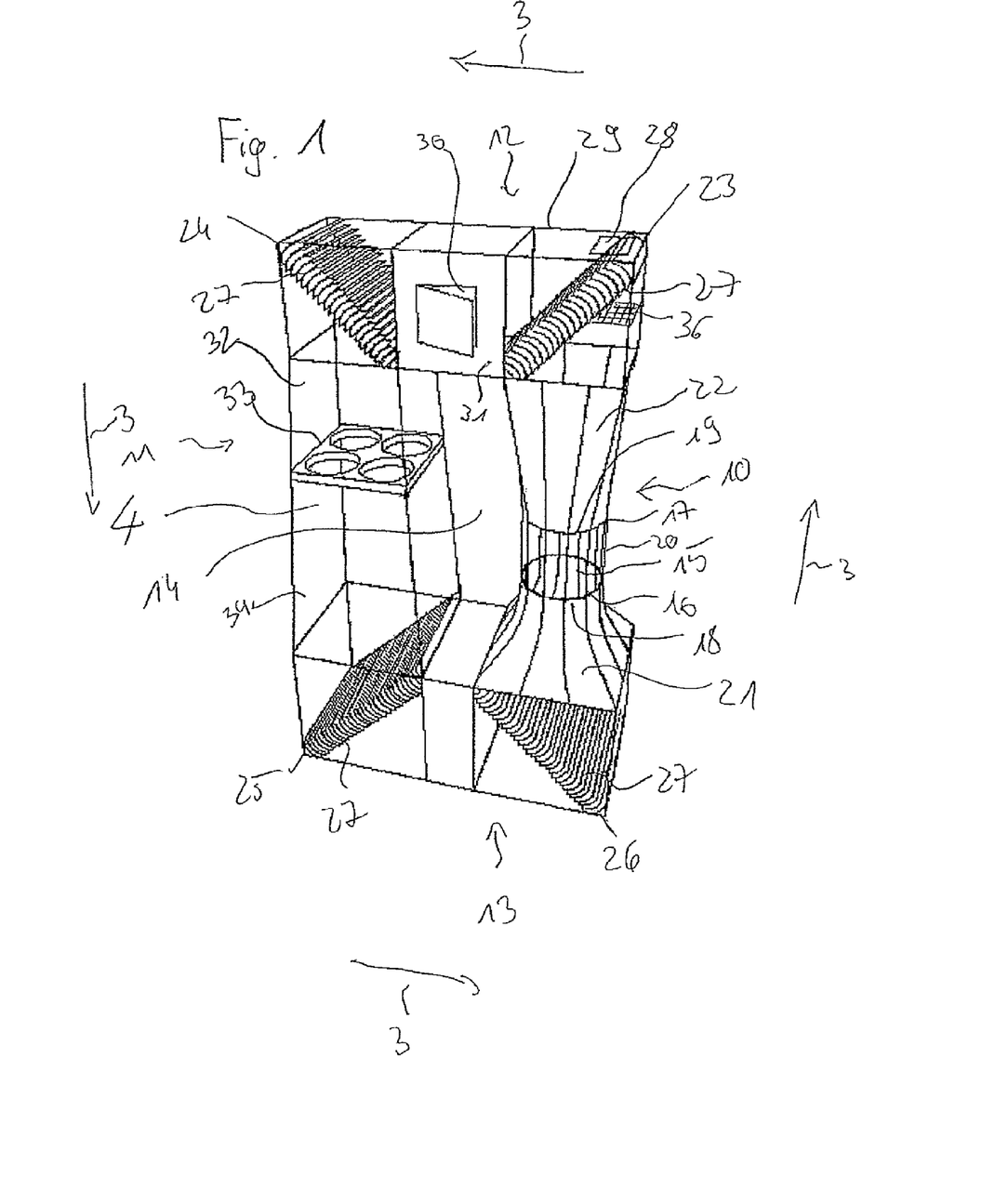
FIG. 1 is a schematic representation of a free fall simulator according to a preferred embodiment of the present invention.

FIG. 1 shows a free fall simulator having a self-contained air circuit, including a first and second vertical section 10, 11 and a first and second horizontal section 12, 13. The two vertical sections 10, 11 as well as the two horizontal sections 12, 13 form a parallelepiped layout with a likewise parallelepiped recess 14 of the cuboid. In individual areas, the actual geometric shape of the unit of the two vertical and horizontal sections 10 to 13 deviates from the basic shape just described. The two vertical sections 10, 11 and the two horizontal sections 12, 13 form an essentially closed air guide channel 4.

A hover chamber 15 is situated in the first vertical section 10 through which, when the free fall simulator is in operation, an air stream directed vertically upward flows such that persons can be kept in a hovering state. The air stream flows into the hover chamber 15 through a lower opening 16 situated at the lower end 18 of the hover chamber, and out of the hover chamber through an upper opening 17 situated at an upper end 19 of the hover chamber 15.

The hover chamber 15 has a dodecagon constant horizontal cross-section from the lower end 18 to the upper end 19. Alternatively, the cross-section may also increase from the bottom to the top (not depicted in FIG. 1) so that the force acting upon a hovering person decreases from the bottom to the top which corresponds to an inherent safety mechanism. However, a free fall can be simulated best with a constant cross-section to the hover chamber 15.

The hover chamber 15 is delimited by the lower opening 16, the upper opening 17 and a side wall 20. In the area of the lower and upper openings 16, 17, safety nets (not shown in FIG. 1) can be mounted which can prevent persons hovering in the hover chamber 15 from hovering too high or too low or in a flight position too far away from the center, and moreover protect the person from injuries during sudden positional changes e.g. due to a changed body position or variations of the air stream. A safety net 36 is disposed (in the present case horizontally) below the air outlet opening 28, thereby preventing objects or persons from being conveyed out of the air outlet opening 28 by the air stream.

A jet nozzle 21 having a horizontal cross-section decreasing from the bottom to the top for accelerating the air stream is disposed below the hover chamber 15. The corresponding cross-sectional area of the jet nozzle 21 decreasing from the bottom to the top passes successively from a rectangle into an irregular dodecagon, and finally in a transition area to the hover chamber 15 into a regular dodecagon.

A diffuser 22 follows at the upper end 17 of the hover chamber 15 to decelerate the air stream exiting the hover chamber 15 and thereby reduce frictional losses and the overheating of the air stream. The horizontal cross-section of the diffuser 22 passes from a regular dodecagon into an upwardly enlarging irregular dodecagon and finally a rectangle.

Downstream of the diffuser 22 (the flow direction is indicated by arrows 3) follows a first redirecting area 23, in which the essentially vertically-directed air stream exiting the diffuser 22 is redirected by about 90°. In analogy, the direction of the air stream is changed by about 90° in each of the second redirection area 24, third redirection area 25 and finally fourth redirection area 26 so that the air stream is conducted back into the hover chamber 15. Redirecting means in the form of redirecting lamellae provide for the redirecting of the air stream in the redirecting areas 23 to 26 in an as homogenous and low-friction manner as possible.

In the first redirecting area 23, an air outlet opening 28 is provided from which a portion of the air stream can exit. The air outlet opening 28 is arranged in an upper horizontally extending boundary 29 of the first redirecting area 23. Further below, it is shown by means of FIGS. 9-11 how the exiting portion of the air stream can be preferably metered. Between the first redirecting area 23 and the second redirecting area 24, an air inlet opening 30 is situated in a first horizontal section 12, through which ambient air for cooling the air stream can enter when the free fall simulator is in operation. The air inlet opening 30 is disposed in a side wall 31 of the first horizontal section 12.

The air stream is redirected via the redirecting means 27 of the second redirecting area 24 by 90° so as to enter a second diffuser 32 of the second vertical section 11. The second diffuser 32 has an approximately rectangular cross-section enlarging from the top to the bottom and reduces the speed of the air stream reaching the fans 33 mounted in the second vertical section 11.

The four fans 33 are arranged in a quadratic configuration within the air guide channel 28 which, in a corresponding area in which the fans are provided, is of a quadratic cross-section.

Preferably, the fans 33 are at least in part made of carbon. It is in particular advantageous to fabricate rotating parts such as fan blades (not shown in FIG. 1) of carbon. This enables a homogenous air stream to be generated (as compared, for instance, to blades made of steel) and the noise level to be reduced. Since carbon (e.g., compared to steel or the like) is a particularly lightweight material, fans 33 having rotating parts made of carbon have a relatively low moment of inertia and therefore respond particularly quickly to a control. It is particularly advantageous to coat the fans at least in part with aramide, in particular aramide fibers. The lifetime of the fans is thus increased.

The air stream is accelerated by the fans 33 and vertically ejected to the bottom. In a third diffuser 34 which, like the second diffuser, has a rectangular cross-section increasing from the top to the bottom, the speed of the air stream is again reduced for reducing frictional losses and overheating of the air stream. The air stream is again conducted to the jet nozzle 21 and hence the hover chamber 15 by the redirecting lamellae 27 of the third and fourth redirecting areas 25, 26.

Figure 2:
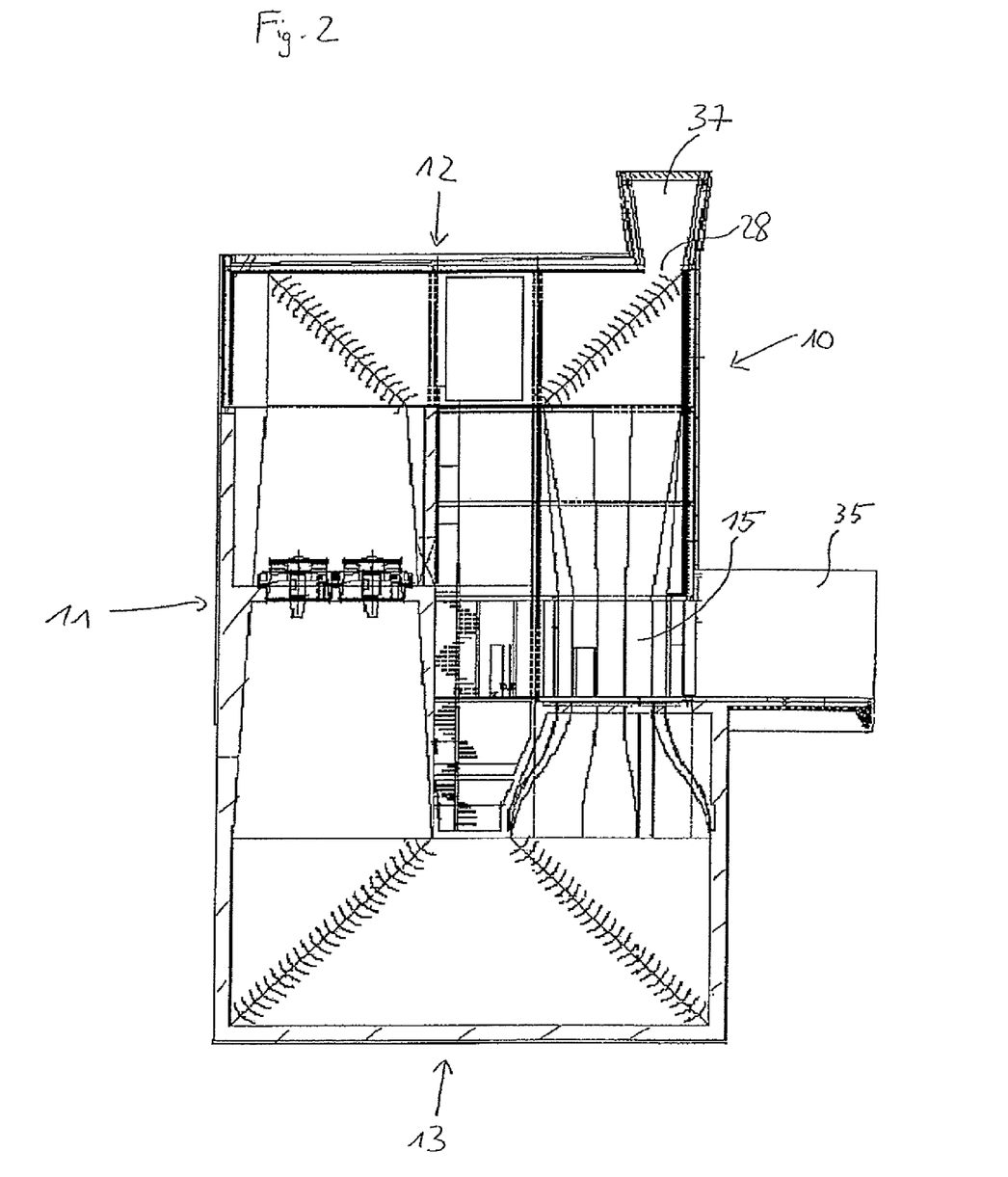
FIG. 2 is a sectional view of a particular embodiment of the free fall simulator according to the present invention.

FIG. 2 shows a preferred configuration of the free fall simulator in a sectional view, wherein the section is along a vertically extending plane. The second horizontal section 13 of the free fall simulator is preferably disposed below a surface area of the ground. The first and second vertical sections 10, 11 and the first horizontal section 12 are preferably situated above the surface area of the ground. Such a construction reduces the height of the free fall simulator relative the surface area of the ground.

Persons wishing to use the free fall simulator can reach the hover chamber 15 through a vestibule 35. In case the vestibule 35 is elevated with respect to the surface area of the ground, an interspace between the floor of the vestibule 35 and the surface area of the ground can remain free or be filled up. Alternatively, the vestibule 35 as well as the hover chamber 15 can also be situated at the level of the ground surface which facilitates the use of the free fall simulator.

An air outlet diffuser 37 is arranged at the air outlet opening 28. The air outlet diffuser 37 in the present exemplary embodiment expands upwardly and provides for the exiting portion of the air stream to have a relatively large spacing with respect to the free fall simulator, respectively an outer shell of the free fall simulator, after exiting completely. The present air outlet diffuser 37 has a trapezoidal vertical cross-section.

Figure 3:
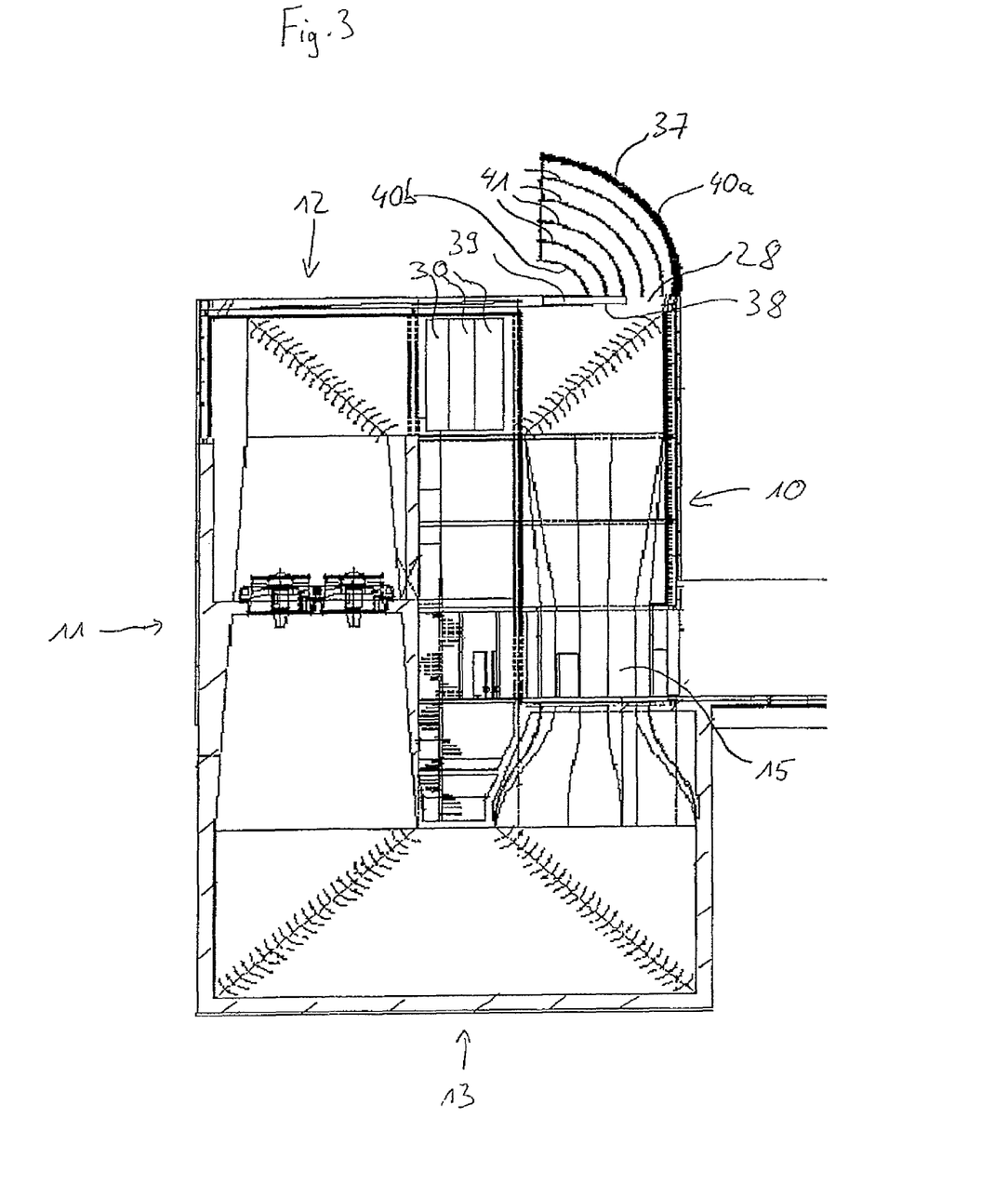
FIG. 3 is an alternative embodiment of the free fall simulator in a sectional view.

FIG. 3 shows a further, preferred embodiment of the free fall simulator. The air outlet opening 28 here is variably adjustable by a closing device 38 comprising a displacing shutter 39. The air outlet diffuser 37 has two parallel curved sections 40a, 40b at its outer surface. Curved guiding lamellae 41 are mounted within the air outlet diffuser 37 for conducting the portion of the air stream exiting the air outlet opening 28 in a manner as laminar as possible away from the outer shell of the free fall simulator.

Instead of only one air inlet opening, as in FIG. 1, for example, several, specifically six air inlet openings 30 (of which only three can be seen in FIG. 3) are provided in the preferred embodiment of FIG. 3.

The air inlet openings 30 preferably can be closed by pivotable inlet shutters (not shown in the figures) which are an integral part of inlet closing devices. The inlet shutters are outwardly pivotable, for example, and form an acute angle, e.g. of 45°, with the outer shell of the free fall simulator.

FIGS. 4-7 show alternative embodiments of the free fall simulator in a schematic view.

Figure 4:
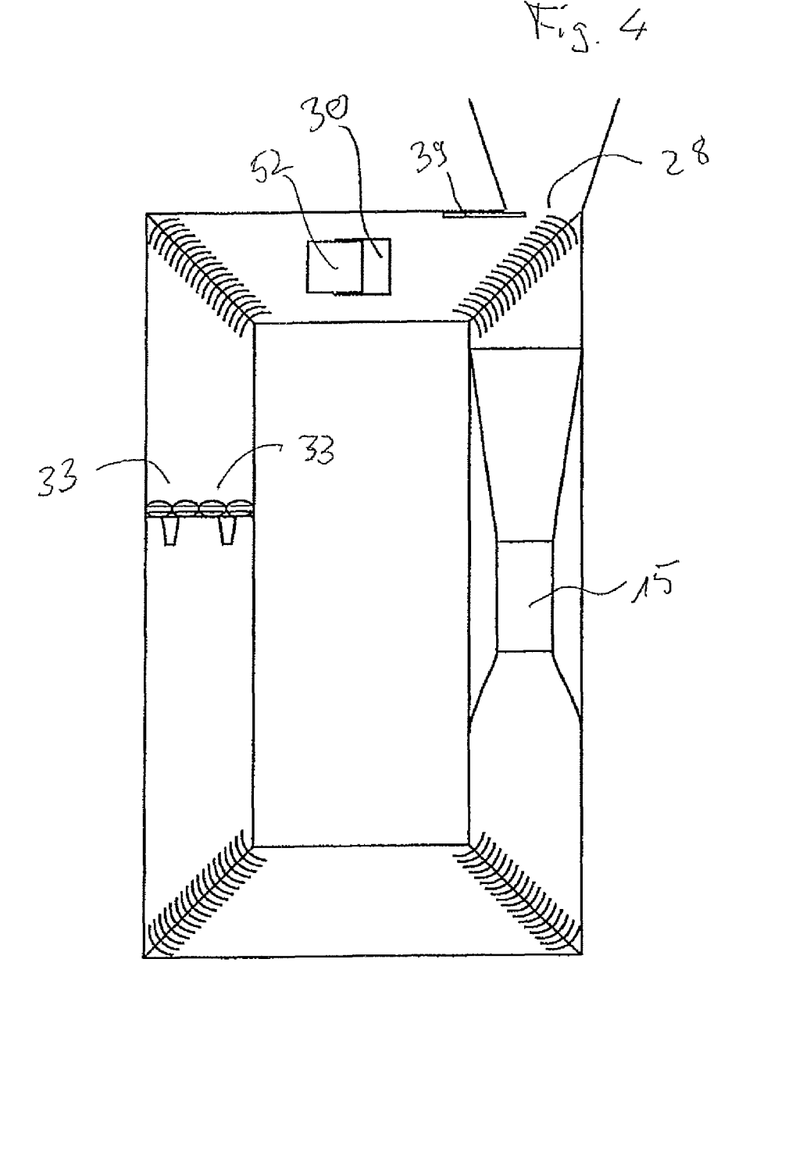
FIG. 4 is a schematic view of an alternative embodiment of the free fall simulator.

In FIG. 4, the air inlet opening 30 is partially closed by the displacing shutter 52. By displacing the displacing shutter 52, the exiting portion of the air stream can be indirectly controlled in the stationary state. The air outlet opening 28 can be closed by the displacing shutter 39, wherein this displacing can be performed correspondingly synchronously to the displacing of the displacing shutter 52 of the air inlet opening 30. An electronic control or regulation would be appropriate for this purpose which, however, is also advantageous even in a non-synchronous adjustment of the air inlet opening 30 or air outlet opening 28.

The synchronous or independent control or regulation of the air inlet opening 30 or air outlet opening 28 can be performed by a central computer (not shown in the figures). Measuring devices (likewise not shown in the figures) can in particular be provided which measure the flow rate, temperature and/or humidity of the air stream in order to allow the air inlet opening 30 and the air outlet opening 28 to be optimally adjusted.

Figure 5:
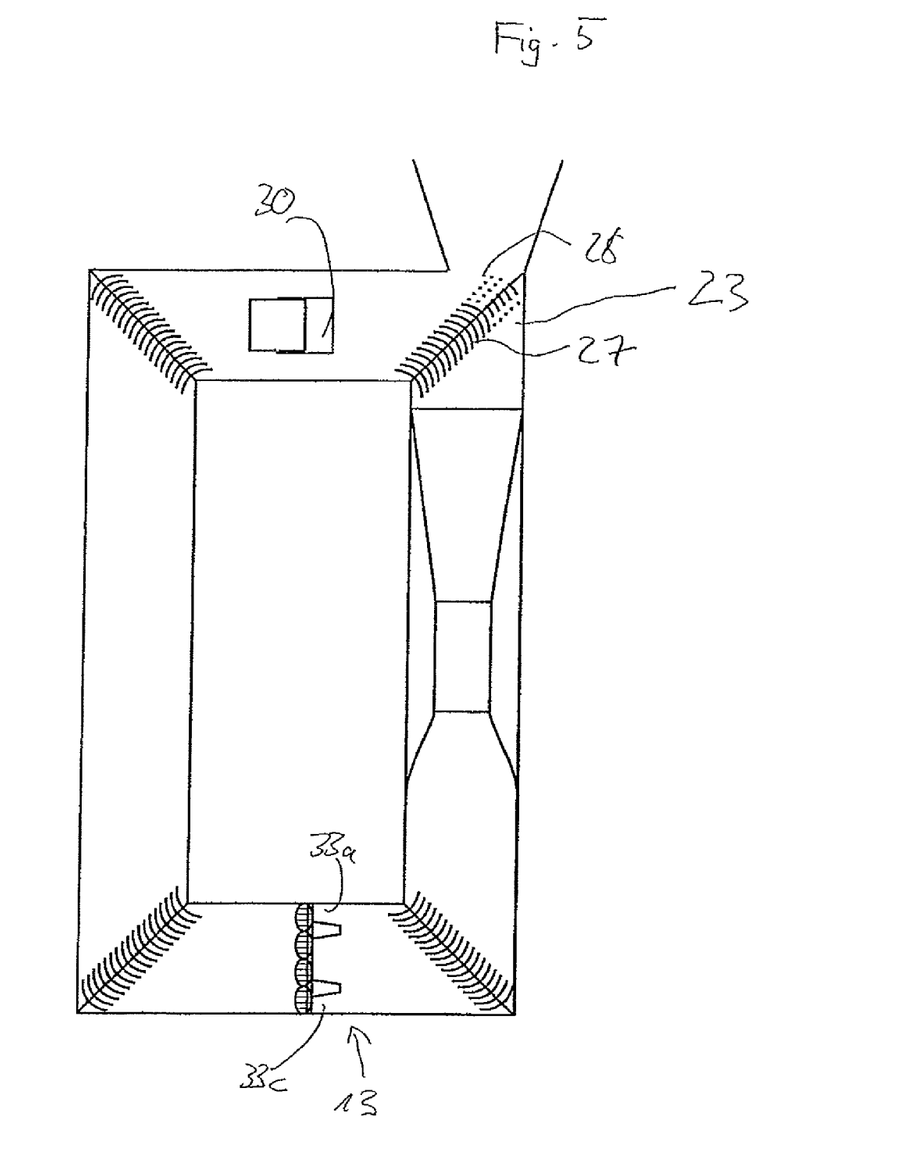
FIG. 5 is a schematic view of a further alternative embodiment of the free fall simulator.

In FIG. 5, the fans 33 (only two of the fans 33 can be seen in FIG. 5) are accommodated in the second horizontal section 13. In particular, situating the second horizontal section 13 below a surface area of the ground 2 (not shown in FIG. 5) thereby considerably reduces the noise impact.

In FIG. 5, four lamellae 27 of the first redirecting area 23 (drawn in dashed lines) are removed. Due to removing the redirecting lamellae 27, the portion of the exiting air stream is increased. The addition of redirecting lamellae 27 correspondingly reduces the exiting air stream portion. As an alternative to the complete removal of the lamellae, same may also be displaced only partially, e.g. in a direction perpendicular to the drawing plane in FIG. 5 (in a horizontal direction) which corresponds to a partial removal of the redirecting lamellae 27, respectively an increase of the exiting air stream portion.

Figure 6:
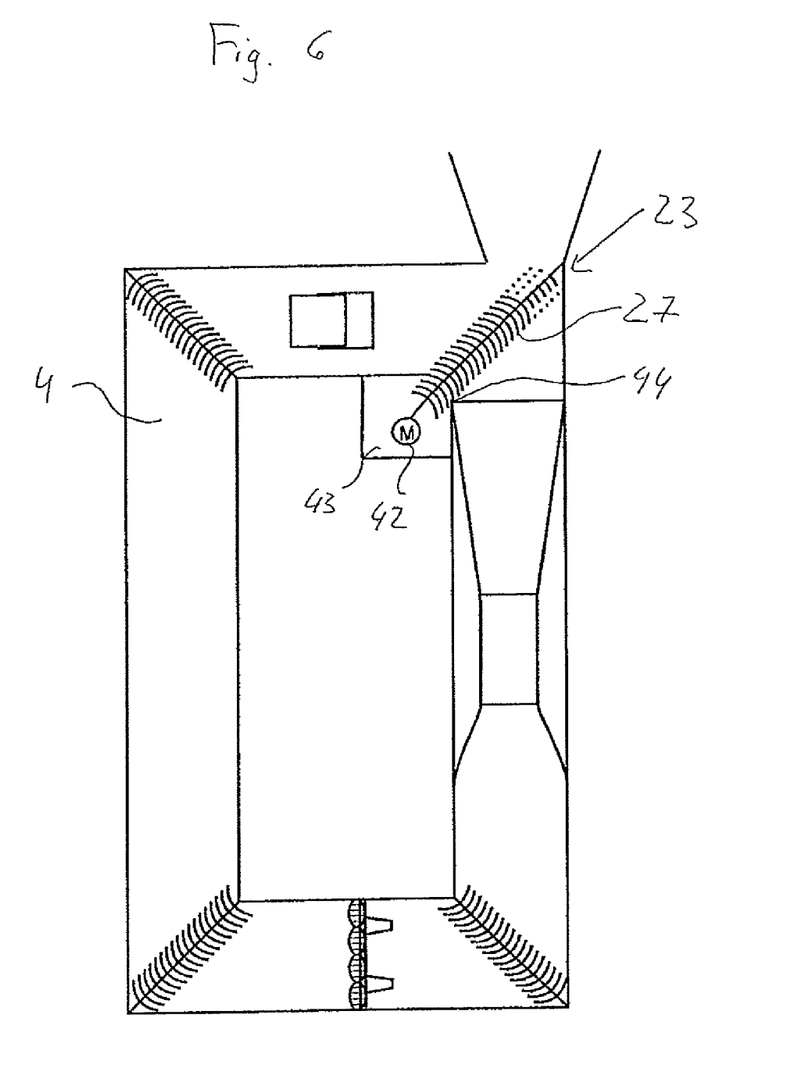
FIG. 6 is a schematic view of a further alternative embodiment of the free fall simulator.

Alternatively to the embodiment from FIG. 5, FIG. 6 shows a particularly preferred embodiment of the free fall simulator. Here, the redirecting lamellae 27 are radially displaceable inwardly as a whole. In the state shown in FIG. 6, the first three redirecting lamellae (here and in the following always counted radially from the inside to the outside) are arranged within a pressure chamber 43. The fourth redirecting lamella 27 closes an opening 44 between the pressure chamber 43 and the first redirecting area 23.

The pressure within the pressure chamber 43 is preferably adjustable so that a minimum pressure difference prevails between the pressure chamber 43 and the air guide channel 4. Pressure loss within the air guide channel is thus minimized.

The redirecting lamellae in FIG. 6 are displaced by the 5-fold distance of two juxtaposed redirecting lamellae 27 related to an initial state (see FIG. 4). In general, it is advantageous for the redirecting lamellae 27 to each be displaceable by a multiple (including the number 1) of the distance of two redirecting lamellae 27. It can thus be achieved that the opening 44 is always closed; i.e. in any arbitrary state of the redirecting lamellae 25 as a whole.

The entirety of the redirecting lamellae 27 is radially displaced by a drive 42 in the form of an electric motor.

Figure 7:
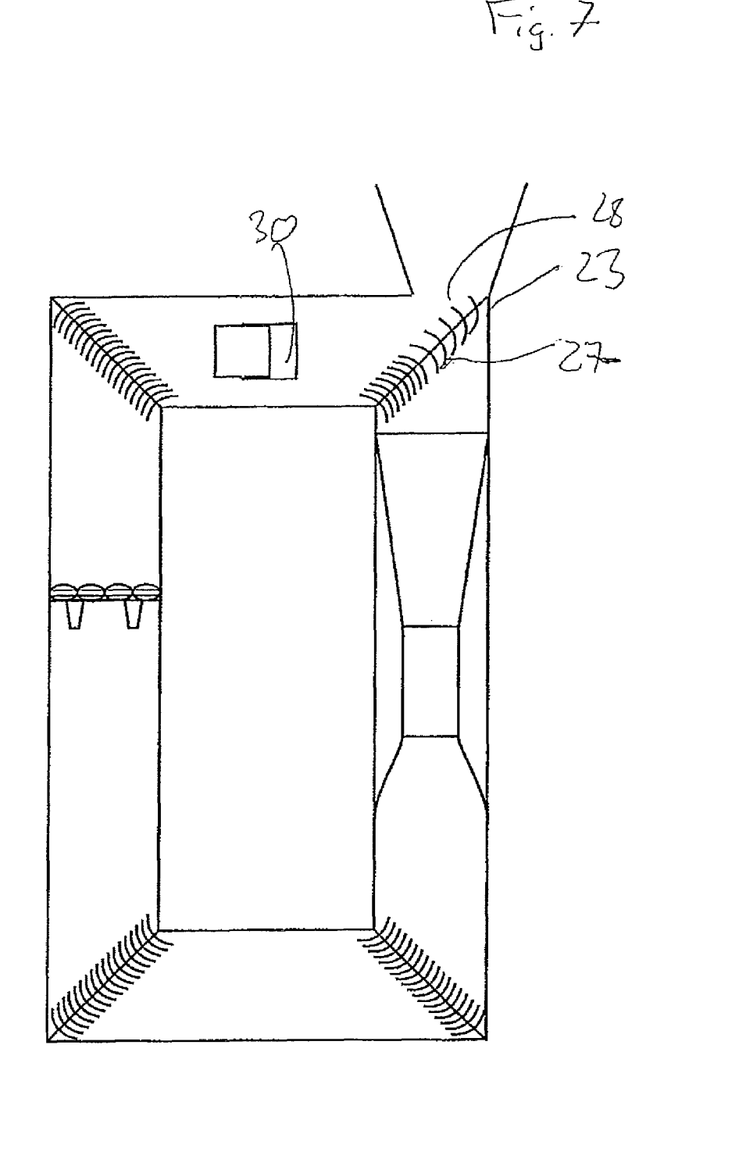
FIG. 7 is a schematic view of a further alternative embodiment of the free fall simulator.

As can be seen in FIG. 7, the portion of the exiting air stream can also be achieved by pivoting one or even several redirecting lamellae 27.

Figure 8:
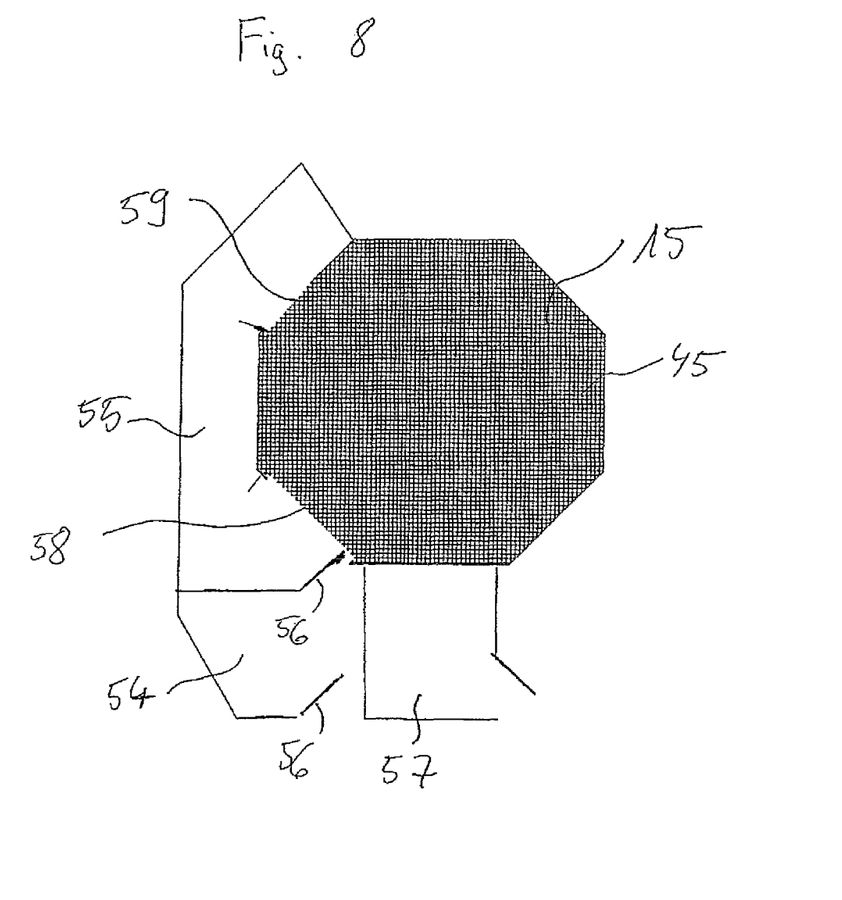
FIG. 8 is a schematic horizontal cross-section through an alternative embodiment of the hover chamber including antechambers.

FIG. 8 shows a schematic horizontal cross-section through an alternative embodiment of the hover chamber 15 including antechambers. The layout of the hover chamber 15 having a safety net 45 is octagonal. The hover chamber 15 can be entered via a hover chamber entrance 58. The hover chamber 15 can be exited again via a hover chamber exit 59.

The hover chamber entrance 58 and the hover chamber exit 59 separate the hover chamber 15 from an entrance area 55. The entrance area 55 is separated from the vestibule 35 (not shown in FIG. 8) by an airlock 54. The airlock 54 can be hermetically sealed by closing devices 56, both with respect to the entrance area 55 and the vestibule 35. A security perimeter 57 is furthermore situated at the side of the hover chamber 15. The hover chamber 15 can be monitored and the control of the free fall simulator simultaneously checked in this security perimeter 57.

In a specific further development, the free fall simulator includes a cooling device as an alternative or in addition, via which a cooling medium can be cooled which can be supplied to the redirecting lamellae. The redirecting lamellae may in this case be manufactured from aluminum or extruded aluminum profiles. The redirecting lamellae have a hollow space through which the cooling medium can flow. It is conceivable for the cooling medium to be supplied via splitter plates, wherein these splitter plates can also be provided with a hollow space. The cooling medium can in particular be water, but it is also conceivable to use other liquids or gases or even solids having advantageous heat-conducting properties.

The embodiment including a cooling device and redirecting lamellae which comprise a hollow space is particularly well suited to reducing the noise pollution in the environment and cooling the air inside the free fall simulator below the ambient temperature. The latter aspect is particularly advantageous in regions of high temperatures. The redirecting lamellae provided with a hollow space hence assume at least two functions, namely, on the one hand, the redirecting of the air stream, and the cooling, on the other. An additional component for the heat or cold transfer can thereby be dispensed with. Moreover, additional pressure losses are avoided which might be caused by separate cooling aggregates to be inserted in the air stream.

At this point, it should be noted that all of the parts described above taken alone or in any combination, in particular the details illustrated in the drawings are claimed as essential to the invention. The skilled person is familiar with modifications thereof. Accordingly, it will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention as defined by the appended claims.

We claim:

1. A free fall simulator having a self-contained air circuit, comprising:
   a hover chamber in which persons can hover as a result of an air stream directed vertically upward, the hover chamber including a lower opening at a lower end thereof and an upper opening at an upper end thereof;
   a substantially closed air guide channel including at least one fan, the channel connecting the lower opening and the upper opening of the hover chamber;
   at least one air inlet opening and at least one air outlet opening for exchanging air within the air guide channel; and
   redirecting lamellae which redirect an air stream within the air guide channel in corner areas or areas of high curvature, wherein at least one air outlet opening is disposed within the redirecting lamellae, wherein the redirecting lamella is displaceable in the radial direction and wherein an air stream exiting the air outlet opening is variably adjustable by changing a cross-sectional area of the air outlet opening.

2. The free fall simulator according to claim 1, wherein a pivotable or displaceable closing device is associated with the air outlet opening for varying exiting air stream.

3. The free fall simulator according to claim 1, wherein the redirecting lamella for varying exiting air stream is pivotable or displaceable.

4. The free fall simulator according to claim 1, wherein the redirecting lamella is formed to correspond to an opening of the air guide channel in such a manner that the opening can be opened or closed as a result of radial displacement of the redirecting lamella.

5. The free fall simulator according to claim 1, wherein a plurality of redirecting lamellae are discretely displacable as a whole in the radial direction by a length corresponding to a distance of two adjacent redirecting lamellae, in such a manner that the opening is closed by one redirecting lamella both before and after a displacing operation.

6. The free fall simulator according to claim 1, wherein the air outlet opening includes a funnel-shaped air outlet diffuser.

7. The free fall simulator according to claim 1, wherein the air inlet opening or the air outlet opening is arranged in an upper air guide channel section.

8. The free fall simulator according to claim 1, wherein the air inlet opening is spatially separated from the air outlet opening by a barrier so that air exiting an air exit opening cannot be re-aspirated by the air inlet opening.

9. The free fall simulator according to claim 1, wherein four fans are arranged in a quadratic configuration within an air guide channel of a quadratic cross-section.

10. The free fall simulator according to claim 9, wherein the fans are formed in a vertical section of the air guide channel.

11. The free fall simulator according to claim 1, wherein a floor surface of the hover chamber is formed as a polygon.

12. The free fall simulator according to claim 1, wherein the hover chamber or the cross-section of a funnel-shaped diffuser which follows the hover chamber expands upwardly.

13. The free fall simulator according to claim 1, wherein the hover chamber has a constant cross-section from a bottom to a top thereof.

14. The free fall simulator according to claim 1, wherein a cross-section of the hover chamber or a cross-section of a funnel-shaped diffuser which follows the hover chamber passes from a bottom to a top from a polygon of a higher order to a polygon of a lower order.

15. The free fall simulator according to claim 1, wherein at least one safety net is provided for protecting persons within the hover chamber or limiting the hover chamber, and wherein damping elements are provided for shock absorption.

16. The free fall simulator according to claim 1, wherein the redirecting lamella can be cooled by a cooling device.

17. The free fall simulator to claim 16, wherein the redirecting lamella has a hollow space into which a cooling medium supplied by the cooling device can be introduced.

18. The free fall simulator to claim 16, wherein the redirecting lamella is made of aluminum.

19. A free fall simulator having a self-contained air circuit, comprising:
- a hover chamber in which persons can hover as a result of an air stream directed vertically upward, the hover chamber including a lower opening at a lower end thereof and an upper opening at an upper end thereof;
- a substantially closed air guide channel including at least one fan, the channel connecting the lower opening and the upper opening of the hover chamber;
- at least one air inlet opening and at least one air outlet opening for exchanging air within the air guide channel; and
- redirecting lamellae which redirect an air stream within the air guide channel in corner areas or areas of high curvature, wherein at least one air outlet opening is disposed within the redirecting lamellae, wherein the redirecting lamella is displaceable in the radial direction and wherein at least one closing device of the air inlet opening for varying incoming air stream is outwardly pivotable or displaceable.

20. A free fall simulator having a self-contained air circuit, comprising:
- a hover chamber in which persons can hover as a result of an air stream directed vertically upward, the hover chamber including a lower opening at a lower end thereof and an upper opening at an upper end thereof;
- a substantially closed air guide channel including at least one fan, the channel connecting the lower opening and the upper opening of the hover chamber;
- at least one air inlet opening and at least one air outlet opening for exchanging air within the air guide channel; and
- redirecting lamellae which redirect an air stream within the air guide channel in corner areas or areas of high curvature, wherein at least one air outlet opening is disposed within the redirecting lamellae, wherein the redirecting lamella is displaceable in the radial direction and wherein closing devices of the air inlet or air outlet openings are controllable or regulatable electronically, wherein the closing devices are synchronized to each other.

21. The free fall simulator according to claim 20, wherein measuring devices are provided for measuring various parameters, wherein measured values obtained by the measuring devices contribute to the electronic control or regulation of the closing device.

* * * * *